3,149,171
PRODUCTION OF CHLOROPRENE
Robert P. Arganbright, Galveston, Tex., assignor to
Monsanto Company, a corporation of Delaware
No Drawing. Filed Jan. 4, 1960, Ser. No. 29
5 Claims. (Cl. 260—655)

The present invention relates to the preparation of chloroprene and more particularly, it relates to an improved process for the preparation of chloroprene from 2-chlorobutenes by a simultaneous chlorination-dehydrochlorination reaction.

It is well known that chloroprene is a highly valuable chemical intermediate. It can be polymerized in the presence of light, heat, or polymerization catalysts under various conditions to yield different rubber-like products. Because the synthetic rubber products produced from chloroprene are superior in some respects to ordinary rubber, there is a great commercial demand for this compound.

Various methods have been proposed for producing chloroprene. Among these are methods for preparing this chlorinated butadiene from dichlorobutenes. For example, various processes involving the removal of hydrochloric acid by basic agents have been proposed. These have the disadvantages of consuming considerable quantities of reagents and are impractical from an economic point of view particularly where there is no outlet for the acid produced and it has to be recovered and converted to chlorine. Also, the treatment with an alkali in some instances yields predominantly other less desirable products instead of the desired monochlorinated butadiene.

Another method involves thermal non-catalytic pyrolysis of certain of the dichlorobutenes. While this gives relatively good yields, conversions and reaction conditions must be very carefully controlled to avoid substantial decomposition to tar and/or carbon.

Some of the problems in the foregoing methods can be overcome by employing catalysts for the dehydrochlorination reaction. Methods have been described for catalytic pyrolysis of the dichlorobutenes as well as for mixtures of these compounds with 2,2,3-trichlorobutane which are obtained by chlorinating 2-chlorobutene-2. Depending upon the catalyst employed, yields of chloroprene from these processes are not much in excess of 60% and in some instances the catalysts employed have short life and must frequently be replaced or regenerated.

In addition to the specific disadvantages already mentioned for the above-described processes, they are all multistage processes, that is, they all involve separate operations for production of the dichlorobutene feed material and its subsequent dehydrochlorination which means that different apparatus, different reaction conditions, different catalysts, etc., are required in the various stages. Thus, the advantages of a process wherein conversion of 2-chlorobutenes directly to chloroprene could be effected in a single operation with high yields and high selectivity are immediately obvious.

It is an object of the present invention to provide an improved process for the production of chloroprene from 2-chlorobutenes in a one-step reaction with yields of the order of 80 to 90% of chloroprene and comparatively little loss to non-useful by-products. Other objects and advantages of the invention will become apparent from the following description thereof.

According to the invention, a mixture of a 2-chlorobutene, hydrogen chloride and oxygen is contacted at an elevated temperature with a catalyst consisting of magnesium chloride supported upon pumice to produce an effluent gas mixture from which chloroprene can be readily recovered in excellent yield.

The invention is illustrated in the following examples which, however, are not to be construed as limiting it in any manner whatsoever.

Example 1

A tubular glass reactor about 4 ft. long and 40 mm. in diameter wrapped with nichrome wire for heating and covered with asbestos insulation was employed as the reactor. A thermowell containing a thermocouple for measuring temperatures was centrally positioned in the reactor extending throughout its length. The catalyst consisting of magnesium chloride supported upon pumice was charged to the reactor and fluidized by passing nitrogen up through it while the reactor was brought up to reaction temperature. Thereafter 2-chlorobutene-2, hydrogen chloride, and air at approximate rates of 1.9 ml. per min. (liquid), 400 ml. per min., and 1000 ml. per min., respectively, were passed successively through rotameters into a mixer and preheater (~300° C.) and then into the reactor where they were contacted with the fluidized catalyst (about 300 ml.) maintained at a temperature within the range from about 450 to about 490° C. As the reactants were introduced, the flow of nitrogen was proportionately reduced so that the velocity of the entering gaseous reactants helped to maintain the catalyst in a fluidized state. A total of about 25 g. of 2-chlorobutene-2 was fed over a reaction period of about 15 min.

Effluent gases from the top of the reactor were passed through a separator filled with glass wool for removal of any entrained catalyst particles and thence into a series of Dry Ice traps and finally through a caustic scrubber for removal of unreacted hydrogenchloride. Off-gas from the scrubber was vented through a wet-test meter.

The liquid product recovered from the Dry Ice traps contained according to gas chromatographic analysis about 46% chloroprene and 2% butadiene, with the remainder being essentially unreacted 2-chlorobutene-2. The calculated yield of chloroprene based on this analysis was 82%.

Example 2

The experiment of Example 1 was repeated using as the feed material a commercial sample of mixed chlorobutenes having the following composition as determined by gas chromatographic analysis, 4% cis-2-chlorobutene-2, 56% trans-2-chlorobutene-2, and 38% 2-chlorobutene-1. The same flow rates were used with the fluidized magnesium chloride catalyst but the reaction temperature was maintained over a slightly higher range from 470° C. to about 520° C. The recovered liquid organic product as analyzed by gas chromatographic means contained 30.1% chloroprene, 32.2% 2-chlorobutene-1, 27.4% trans-2-chlorobutene-2, 6.5% cis-2-chlorobutene-2, 1.2% butadiene and 1.7% of an unknown boiling at about 15° C. Titration of the off-gas scrubber liquid showed that 2% of the chlorobutene feed was oxidized to carbon dioxide. The yield of chloroprene in this experiment was calculated to be about 91%.

Variations in conditions from those given in the example may be made without departing from the scope of the invention. The reaction may be carried out by mixing the 2-chlorobutene with hydrogen chloride and air or oxygen and passing the mixture in contact with the catalyst in a heated reaction chamber; or if desired, the mixture may be introduced into the reaction zone in three separate streams; or the air or oxygen may be introduced into a mixture of the 2-chlorobutene and hydrogen chloride. Precaution should be taken to avoid allowing the 2-chlorobutene and oxygen to reach reaction temperature in the absence of hydrogen chloride.

In the preferred embodiment of the invention, the catalyst is employed in the fluidized or pseudo liquid state.

It is maintained in a fluid or suspended state by the gaseous reactants themselves or optionally, by the use of an additional inert gas introduced from an outside source. The use of a fixed bed operation, however, is not outside the scope of the invention.

The relative proportions of the reactants may vary considerably. Preferred proportions are those corresponding to the stoichiometric proportions required to effect monoallylic chlorination of the 2-chlorobutene charged, that is, a 1:1:0.5 ratio of 2-chlorobutene to hydrogen chloride to oxygen or 1:1:2.5 if air is used instead of oxygen. Since hydrogen chloride is not consumed in the reaction, only very small amounts, if any, of this reactant need be fed once the reaction has been initiated if provision is made for recycle of the hydrogen chloride. Excesses of the 2-chlorobutene and air may be employed if desired without significantly affecting the reaction.

Contact time is not too critical and may vary from about 0.5 second to about 12 seconds.

Reaction temperature is a critical factor and the temperature must be maintained above about 450° C. to effect the reaction. Preferably, the temperature is maintained in the range from about 480° C. to 520° C. Although temperatures above 520° C. and up to 600° C. can be employed, some carbon begins to deposit on the catalyst at these higher temperatures.

The catalyst for the process is readily prepared by saturating pumice with a solution, aqueous or otherwise, of magnesium chloride and filtering and drying the impregnated pumice. Further drying may be effected by means of a flow of nitrogen (or other inert gas), hydrogen chloride and/or air through the mass of catalyst while it is being heated to reaction temperature after it has been charged to the reactor. A more active catalyst is prepared from a methanolic solution of magnesium chloride. Better catalytic activity has also been observed for a catalyst prepared and dried under vacuum. The catalyst may be readily regenerated by heating with air at a temperature of about 500° C. to "burn off" any deposited carbon from its surface.

What is claimed is:

1. A process for the production of chloroprene which comprises reacting a 2-chlorobutene with hydrogen chloride and oxygen in the presence of a catalyst consisting of magnesium chloride supported upon pumice at a temperature above about 450° C.

2. A process for the production of chloroprene which comprises reacting a 2-chlorobutene with hydrogen chloride and oxygen at a temperature in the range from about 450° C. to about 520° C. in the presence of a catalyst consisting essentially of magnesium chloride supported upon pumice.

3. A process for the production of chloroprene which comprises reacting 2-chlorobutene-2 with hydrogen chloride and oxygen in the molecular ratio of 1:1:0.5 at a temperature in the range from about 450° C. to about 520° C. in the presence of a catalyst consisting essentially of magnesium chloride supported upon pumice.

4. A process for the production of chloroprene which comprises reacting 2-chlorobutene-1 with hydrogen chloride and oxygen in the molecular ratio of 1:1:0.5 at a temperature in the range from about 450° C. to about 520° C. in the presence of a catalyst consisting essentially of magnesium chloride supported upon pumice.

5. A process for the production of chloroprene which comprises reacting a mixture of 2-chlorobutenes with hydrogen chloride and oxygen in the molecular ratio of 1:1:0.5 at a temperature within the range from about 450° C. to about 520° C. in the presence of a catalyst consisting essentially of magnesium chloride supported upon pumice.

References Cited in the file of this patent

UNITED STATES PATENTS

| | | |
|---|---|---|
| 2,281,096 | Engs et al. | Apr. 28, 1942 |
| 2,308,489 | Cass | Jan. 19, 1943 |
| 2,395,314 | Blumer | Feb. 19, 1946 |
| 2,602,021 | Belchetz | July 1, 1952 |
| 2,803,679 | Conrad | Aug. 20, 1957 |

FOREIGN PATENTS

| | | |
|---|---|---|
| 180,421 | Austria | Dec. 27, 1927 |

OTHER REFERENCES

Engel et al.: Chemistry and Industry, pages 76–82, January 13, 1962.